(12) United States Patent
Abdulhayoglu

(10) Patent No.: US 11,335,341 B1
(45) Date of Patent: May 17, 2022

(54) VOICE ORCHESTRATED INFRASTRUCTURE SYSTEM

(71) Applicant: Ezlo Innovation LLC, Clifton, NJ (US)

(72) Inventor: Melih Abdulhayoglu, Montclair, NJ (US)

(*) Notice: Subject to any disclaimer, the term of this patent is extended or adjusted under 35 U.S.C. 154(b) by 76 days.

(21) Appl. No.: 16/775,240

(22) Filed: Jan. 28, 2020

Related U.S. Application Data

(60) Provisional application No. 62/797,949, filed on Jan. 29, 2019.

(51) Int. Cl.
*G10L 15/22* (2006.01)
*H04M 7/00* (2006.01)

(52) U.S. Cl.
CPC .......... G10L 15/22 (2013.01); H04M 7/006 (2013.01); *G10L 2015/223* (2013.01)

(58) Field of Classification Search
USPC ................................................. 704/1–504
See application file for complete search history.

(56) References Cited

U.S. PATENT DOCUMENTS

| | | | | |
|---|---|---|---|---|
| 8,374,721 B2* | 2/2013 | Halloran | ............... | A47L 9/2894 342/450 |
| 9,392,920 B2* | 7/2016 | Halloran | ............... | B25J 9/0003 |
| 9,599,990 B2* | 3/2017 | Halloran | ............... | G05D 1/0227 |
| 9,901,236 B2* | 2/2018 | Halloran | ............... | A47L 11/4061 |
| 10,182,695 B2* | 1/2019 | Halloran | ................ | A47L 9/30 |
| 11,087,739 B1* | 8/2021 | Rastrow | ................ | G06F 40/216 |
| 2011/0161076 A1* | 6/2011 | Davis | ................ | H04M 1/72448 704/E15.001 |
| 2018/0019890 A1* | 1/2018 | Dawes | ................ | H04L 12/4625 |
| 2018/0191720 A1* | 7/2018 | Dawes | ................ | H04L 12/2825 |
| 2018/0191740 A1* | 7/2018 | Decenzo | ............. | H04L 12/2803 |
| 2018/0191807 A1* | 7/2018 | Dawes | ................ | H04L 12/2803 |
| 2019/0179610 A1* | 6/2019 | Aiken | ...................... | G10L 15/22 |
| 2019/0245869 A1* | 8/2019 | Dawes | ................... | G06F 3/041 |
| 2019/0295542 A1* | 9/2019 | Huang | ................... | G06F 3/167 |
| 2020/0126119 A1* | 4/2020 | Naidu | ................ | G06Q 30/0254 |
| 2021/0262648 A1* | 8/2021 | Abdulhayoglu | .......... | F21K 9/66 |

* cited by examiner

*Primary Examiner* — Marcus T Riley
(74) *Attorney, Agent, or Firm* — Joseph P. Aiena

(57) ABSTRACT

There is provided a voice orchestrated infrastructure system which includes a hub in communication with at least one endpoint device located in a room or area, and the endpoint device is in communication with the hub and at least one endpoint device in a second room or area through the hub. The hub includes a set of non-transitory commands which when executed with a central processor the at least one endpoint device is activated and controlled by voice commands which are independent of service provider type. The hub includes a non-transitory computer-readable storage medium which stores computer-executable instructions that, when executed by a processor, cause the processor to perform operations for determining the voice command which is communicated to and from the at least one end point.

3 Claims, 5 Drawing Sheets

FIG. 2 VOI Bridge Components Diagram

FIG. 3 VOI Bridge Components Diagram

FIG. 4 VOI Bridge System Diagram

VOICE ORCHESTRATED INFRASTRUCTURE SYSTEM

CROSS REFERENCE TO RELATED APPLICATIONS

This application claims benefit of and priority to U.S. Provisional Application No. 62/797,949 field on Jan. 29, 2019 and incorporated herein by reference in its entirety.

BACKGROUND

Smart home devices provide convenience and productivity for users, but compatibility of different brands arise for each endpoint device. There is a need for smart home control which is independent of the personal assistant device that is used with the endpoint devices.

SUMMARY OF THE INVENTION

There is provided a voice orchestrated infrastructure system for use with and in creating smart homes that are controlled by one or more authorized users from a centralized hub device. For one or more of the rooms in a residence or dwelling, each of the rooms has embedded or fastened in fixtures and devices within the room, microphones and speakers which are in communication with the central hub system and also with each other through the central hub system via wi-fi networking. The system of the present invention is not dependent on any particular brand of voice controlled personal assistant device (such as Siri/Alexa/Nest). Microphones/speakers/video are all controlled and communicated directly through one hub. Service provider that is utilized does not matter. As the voice orchestrated infrastructure is agnostic as to the system or type of personal assistant device employed by the user(s).

The system has Wi-Fi capability to talk to the hub and authorized devices. Motion detection via sound effects to activate the room devices. All privacy is controlled through the hub, along with security features. Communication system protocol—devices in each room of house or dwelling acting as a telephone.

Voice command is directed to an appropriate destination, such as a room, or particular endpoint device in a room. This includes lights, thermostats, electric outlets, appliances—washer, dryer, stove, refrigerator, oven, range, automated vacuums. Security systems for windows and doors, motion detectors, smoke detectors.

DETAILED DESCRIPTION

Figure 1:
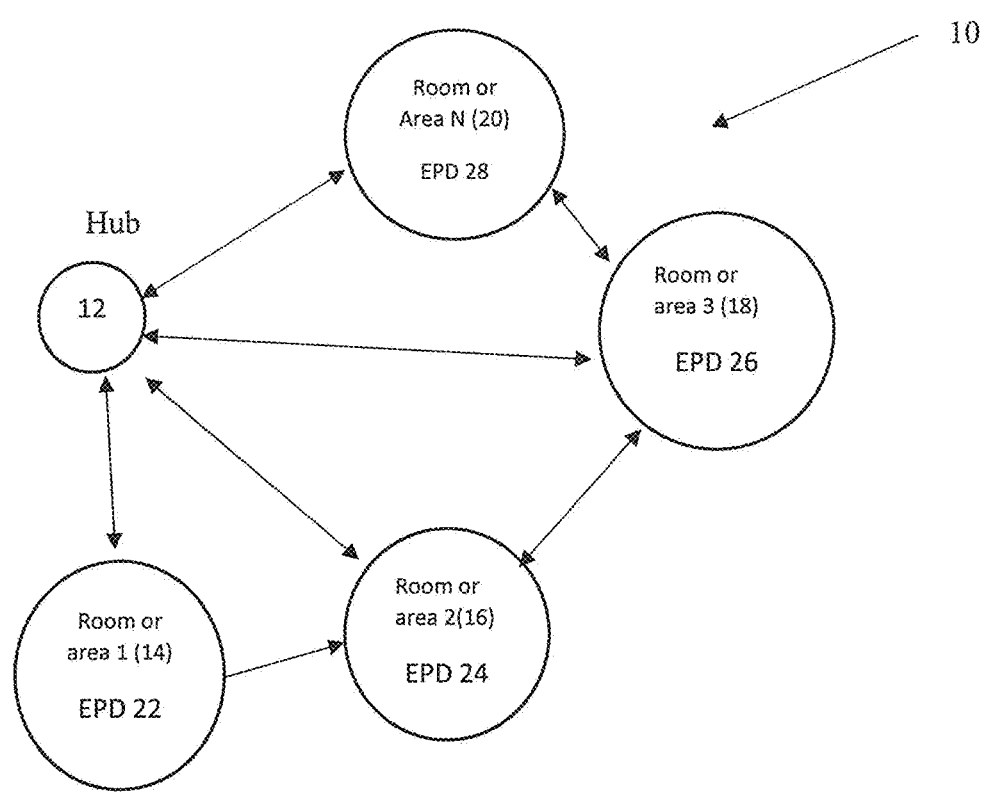
FIG. 1 is an illustration of a hub connected to one or more rooms each with endpoint devices.

As illustrated in FIG. 1 for the present invention 10, each of the Room or area 1 (14), Room/area 2 (16), and Room/area 3 (18) and a plurality of other rooms or areas, designated as room or area N (20), are connected and in communication to the hub 12, with each room or area having one or more endpoint devices (EPD) 22, 24, 26, and 28, such a light switches, outlets, appliances etc. All endpoints 22, 24, 26, and 28 are voice orchestrated or controlled and have microphones and speakers at the endpoints 22, 24, 26, and 28 for communication with, from and back to the hub 12. Through the hub 12, communication can be made to and from any room 14, 16, 18 or 20 for activating or deactivating or adjusting/controlling any device or endpoint 22, 24, 26, and 28 in the room. The system 10 can be synched and controlled with laptop or hand held devices as well whether by voice control or applications. Proprietary software and rules are designed for the hub and system to execute the system of the present invention.

Figure 2:
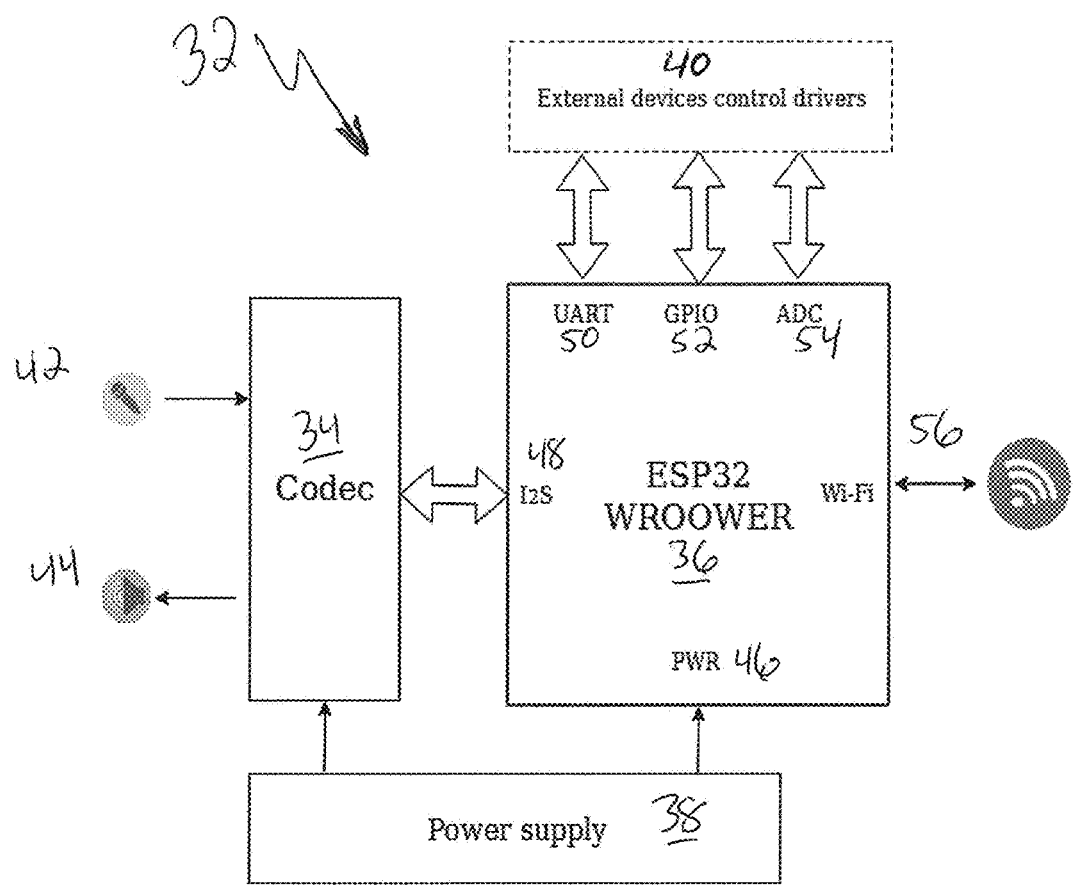
FIG. 2 is a schematic of the voice orchestrated infrastructure bridge components.

Bridge Description:

Referring to FIG. 2, there is shown the VOI bridge components 32. The VOI bridge is a small-sized device based on Espressif ESP-32 chip (eXtensa ESP32). The bridge 32 consisting an array of MEMS microphones 42 connected to an audio codec 34 and an ESP32 Wi-Fi/BT enabled 32 bit microcontroller. The MEMs microphone array on the bridge allows you to leverage voice recognition in your app creations by using the latest online cognitive services including Microsoft Cognitive Service, Amazon Alexa Voice Service, Google Speech API, Wit.ai and Houndify. The bridge provides to users the opportunity to integrate custom voice and hardware-accelerated machine learning technology right onto the silicon. It's for makers, industrial and home IoT engineers. It allows for triggering events based on sound detections, such as receiving a text message when your dog is barking back home. One of the examples of working with bridge—you can build your own Amazon's Alexa using the Bridge 32. Bridge contains the following peripherals: ac/dc power converter 38, 46; general purpose input/output 52, universal asynchronous receiver transmitter (UART) 50, analog-digital converter (ADC) 54, voice/sound streaming information 42, 44; network interface; status indicators; control buttons; low power drivers for control external devices 40 (optional); may have wireless 56 interfaces on-board such as Bluetooth/ZigBee/Z-Wave (optional). External audio coded 34 is used for input/output and coding/decoding of voice/sound information 42, 44. Bridge can work/have internal and external microphones and built-in speaker.

In an embodiment, the end points 22, 24, 26, 28 include a voice proximity sensor and can also be combined with an amplification sensor for the sound wave, as well as at least one directional sensor. In this manner, an individual speaking a command (such as "turn lights on" or "turn lights off") can direct the command to a specific endpoint 22, 24, 26, 28 within a room or a specific room as they enter or leave in order to distinguish from an endpoint in the adjacent room.

Figure 3:
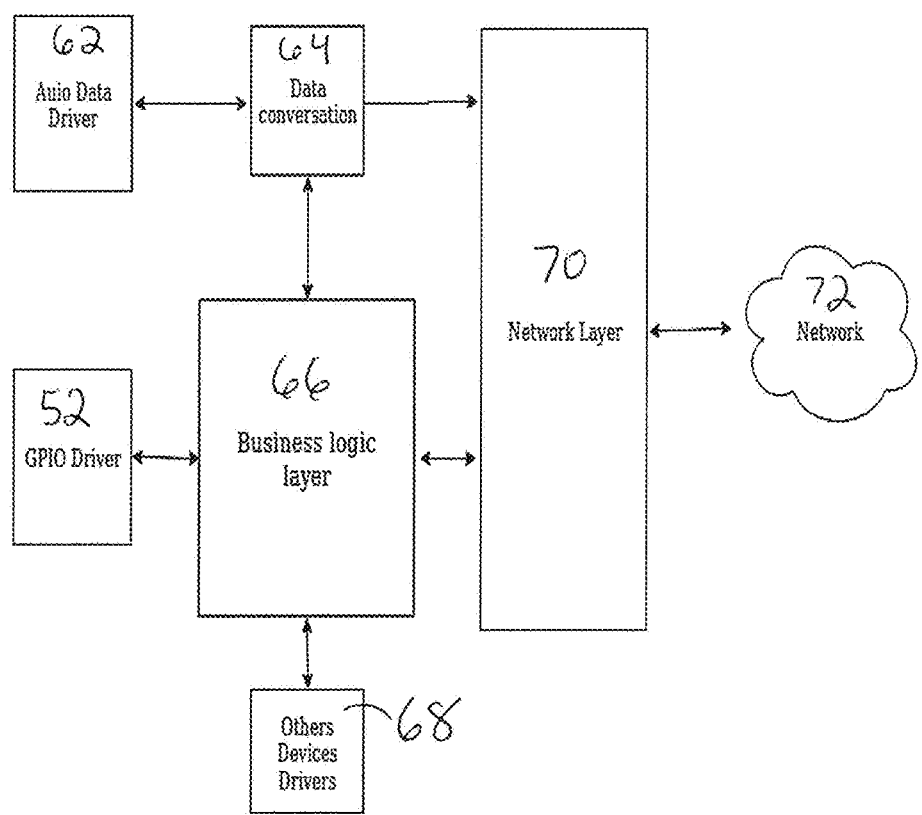
FIG. 3 is a diagram of the bridge components showing drivers, logic layers, and network layers.

Bridge Functions:

The present invention includes perception of voice commands, coding, transmitting to remote voice web-service 84 (Amazon Alexa, Google Assistant, etc.) using protected HTTP connection. This includes: receiving, uncoding, unpacking and playing of sound/voice response from remote voice web-service. There is also receiving of REST-requests from own web-service (NMA) and control of devices with the help of GPIO's 52 pins or using wireless interfaces. See FIG. 3 to reference the audio data driver 62, communicating and transmitting to data conversion 64 which is in communication with the network layer 70 and business logic layer 66. The business logic layer 66 communicates with the GPIO driver 52 and other device drivers 68. The business logic layer also communicates with the network layer 70 which is in communication with the network 72.

Figure 4:
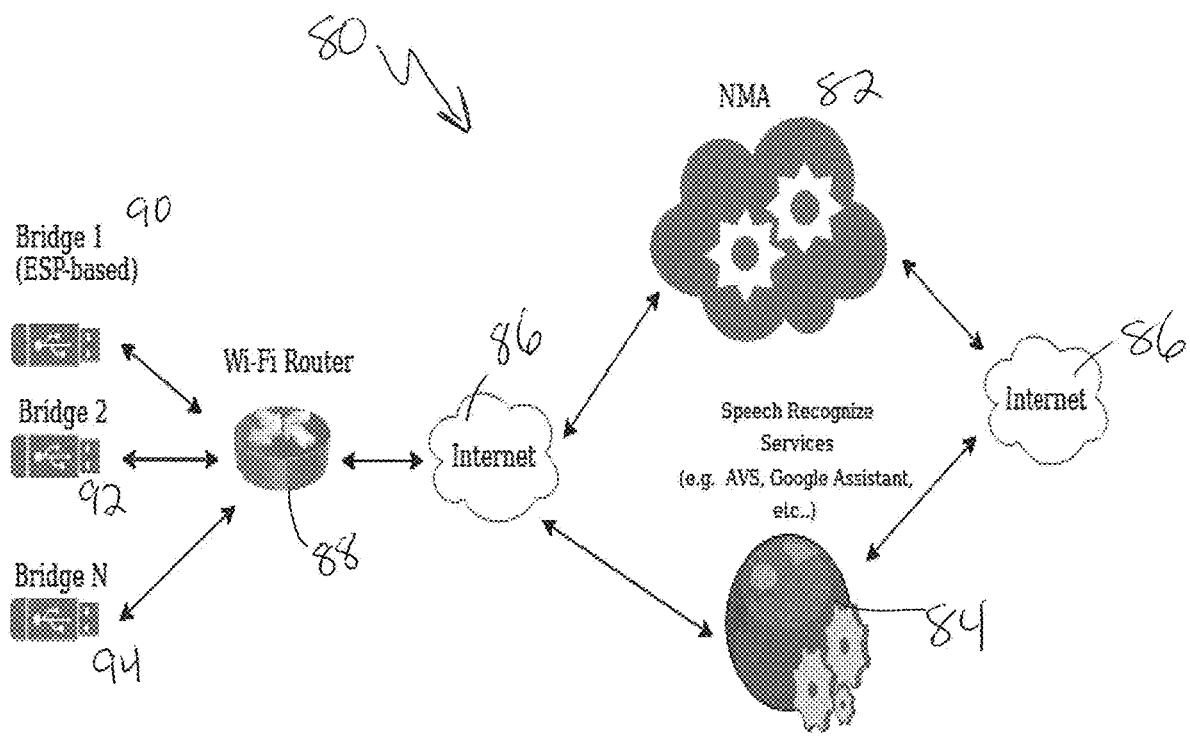
FIG. 4 is a diagram of the bridge system components.

NMA Functions:

Referring to FIG. 4, there is shown the bridge system diagram 80. This bridge system includes a multitude of ESP based bridges 90, 92, 94 connected and communicating with a Wi-Fi router 88 in connection to the internet 86. Communication with an NMA 82 and a speech recognition services 84 to and from the internet 86 is also provided.

NMA 82 is a web service that contains event handlers for voice web services. It handles requests from a remote voice web service (Amazon Alexa, Google Assistant, etc) 84. It sends REST bridge requests according to its own business logic, which is based on processing events from a remote voice web service.

Functions of the Remote Voice Web Service.

This service has the functionality to recognize voice information, the formation of a voice response based on intellectual processing of input data (contains intellectual voice chat) and also contains easily configurable voice command handlers (e.g. Alexa Skills) and NMA web service management.

Working Flow:

After power supply to the bridge, the device enters the standby mode of initialization, which is displayed by the indicator. The device is initialized by pressing the "mic" button or by pre programmed wake-up word. In the initial initialization mode, the bridge raises the access point with the SSID (brige_xxxxx). This is necessary to configure the basic parameters such as WIFI AP and voice web service account 84. Setup is performed using a mobile IOS/Android application. The user installs the mobile application. The mobile device must be connected to the WIFI AP bridge. After successful setting, the bridge disables the access point. To reset the settings, you must hold the "reset" button.

The configured bridge connects to the NMA 82 and also has a connection to the remote voice web service 84. After successfully connecting to the NMA 82, the bridge is waiting for the wake-up voice command word. The user has the ability to customize the wake-up word voice command using a mobile application. User information will be stored in the bridge ROM in encrypted form. The key for encryption is located in a secure section of the flash. These states are accompanied by light/sound indication.

The user initiates voice control of bridge by the wake-up word. After processing of wake-up word, the bridge goes into the mode of transmitting voice information to the voice service. A voice communication session has a specified timeout upon completion of which commands are not transmitted to the voice service. For subsequent sessions, you must repeat the pronunciation of wake-up word. Initialization of communication sessions is accompanied by a light/sound indication. The voice service receives voice information from the bridge, processes the request, sends an audio response to the bridge, and, if necessary, transmits the necessary request to the NMA. NMA in turn controls the bridge. (See FIG. 4)

Figure 5:
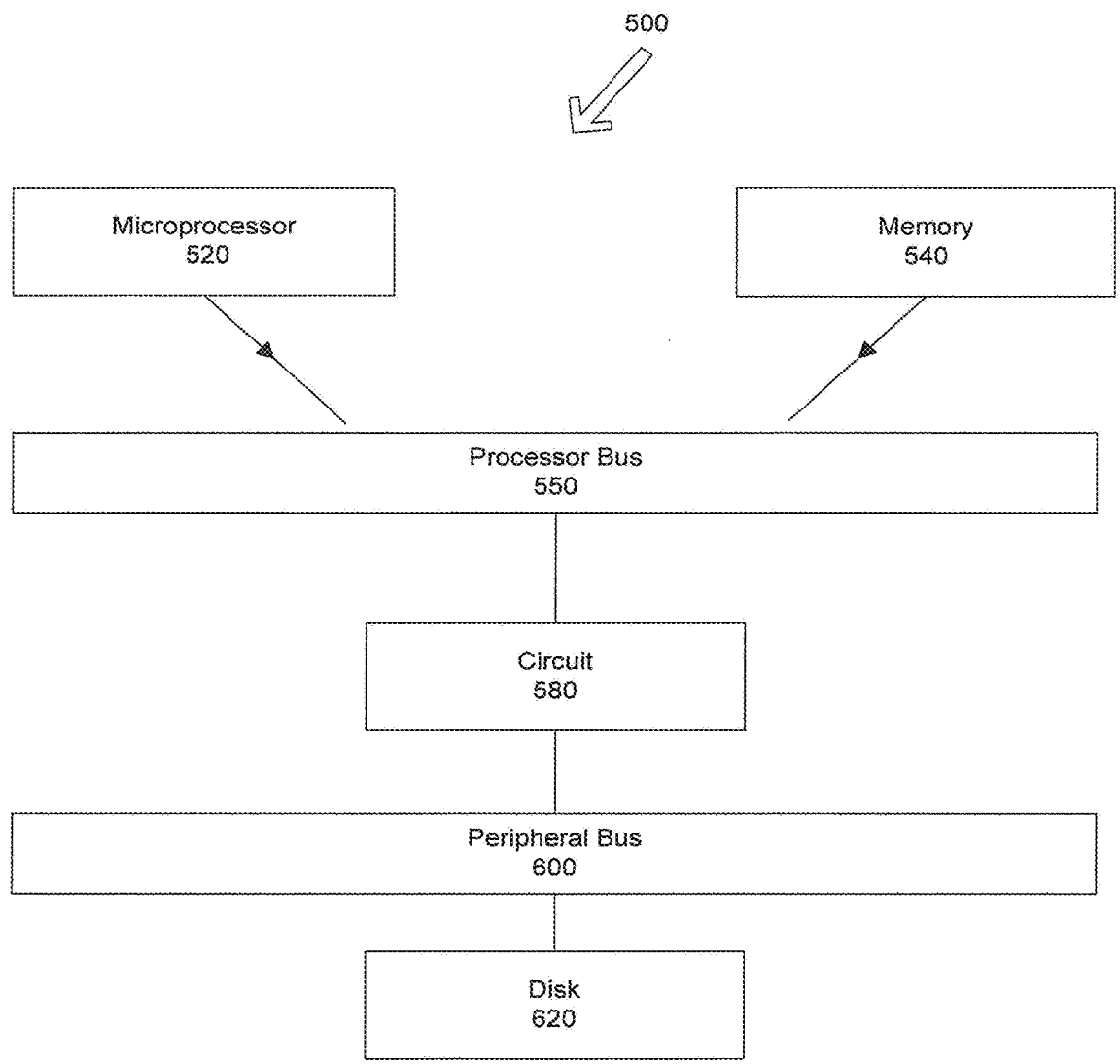
FIG. 5 is a schematic of the computer device components of the present invention.

FIG. 5 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

What is claimed is:

1. A voice orchestrated infrastructure system comprising,
a hub in communication with at least one endpoint device located in a first room or area, said at least one endpoint device in communication with said hub and at least one endpoint device in a second room or area through said hub, said hub including a set of non-transitory commands which are executed with a central processor;
said at least one endpoint device located in said first room or area activated and controlled by voice commands which are independent of service provider type;
a voice orchestrated infrastructure bridge device comprising an ESP32 chip and including an array of MEMS microphones connected to an audio codec and a Wi-Fi/blue tooth enabled microcontroller, said voice orchestrated infrastructure bridge device integrating custom voice and hardware accelerated machine learning technology onto said voice orchestrated infrastructure bridge device;
said hub having a non-transitory computer-readable storage medium which stores computer-executable instructions that, when executed by a processor, cause the processor to perform operations for determining the voice command which is communicated to and from said at least one endpoint device;

each of said at least one endpoint device in said first room or area having a voice proximity sensor combined with an amplification sensor and a directional sensor to direct the voice command to a second of said at least one endpoint device within said first room or area to distinguish said second of said at least one endpoint device within said first room or area from said at least one endpoint device in a second room or area.

2. The voice orchestrated infrastructure system of claim 1 wherein said voice orchestrated infrastructure bridge device further includes an ac/dc power converter, an input/output peripheral, a universal asynchronous receiver transmitter, and an analog/digital converter.

3. The voice orchestrated infrastructure system of claim 2 further comprising an audio data driver communicating and transmitting to a data conversion which is in communication with a network layer and a business logic layer, said business logic layer in communication with said input/output peripheral and said business logic layer in communication with said network layer, said network layer in communication with a network.

* * * * *